May 27, 1958 W. FALCK ET AL 2,836,741
DYNAMO-ELECTRIC AMPLIFIER
Filed Sept. 8, 1955
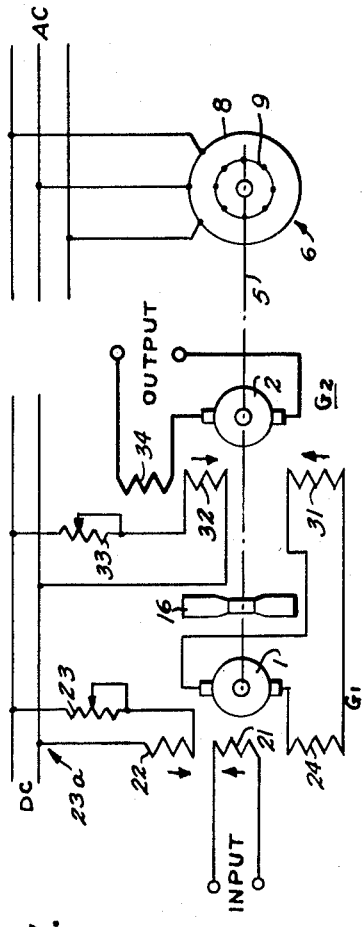
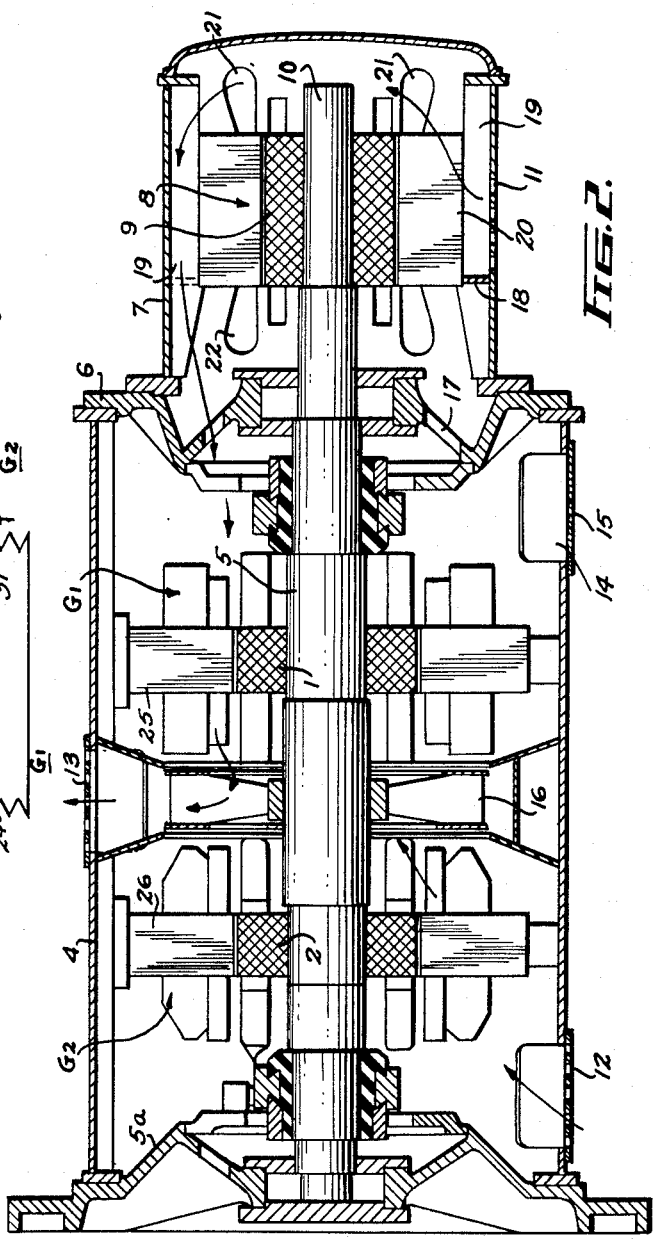

United States Patent Office 2,836,741
Patented May 27, 1958

2,836,741

DYNAMO-ELECTRIC AMPLIFIER

Werner Falck, Ernst Röder, and Siegfried Voll, Nurnberg, Germany, assignors to Siemens-Schuckertwerke Aktiengesellschaft, Berlin-Siemensstadt and Erlangen, Germany, a corporation of Germany Application September 8, 1955, Serial No. 533,169

Claims priority, application Germany September 9, 1954

11 Claims. (Cl. 310—59)

Our invention relates to dynamo-electric amplifiers for control and regulating purposes, and is directed particularly to such machines having two series-connected direct-current generators the rotors of which are arranged along a shaft common with the output shaft of the drive motor.

The principal object of our invention is to provide a dynamo-electric apparatus of the character described that is unusually small in size for a given rating, whereby it can be used in installations wherein the use of prior dynamo-electric amplifiers was precluded because of weight or size limitations.

Another object of our invention is to reduce the cost of dynamo-electric machines of the above nature.

To this end, and in accordance with a feature of our invention, we mount the drive motor rotor and the rotors of direct-current generator stages on a common shaft, the drive motor being at one end of the shaft, and equip the shaft with a ventilating fan between the generator rotors. Air intake and outlet ports and ducts are so arranged on housings enclosing the drive motor and generators that the generator and motor windings and cores are forced-air cooled by action of the ventilating fan to such an extent that a substantial over-all reduction in machine size with respect to comparable machines heretofore used is attained.

These and other objects and features of the invention will be apparent from the following description taken in conjunction with the attached drawings. In the drawings, illustrating a preferred embodiment of our invention:

Fig. 1 is an electrical schematic diagram of a machine according to the invention, and Fig. 2 is a longitudinal cross section of the machine.

As illustrated in Fig. 1, the two-stage amplifying machine comprises two direct-current generators G1 and G2 having respective armatures 1, 2 mounted on a common shaft 5 with the rotor 9 of a synchronous drive motor 8. The generator G1 constitutes the first or input stage, and the generator G2 the second or output stage of the amplifier. Generator G1 has a series field winding 24 (see Fig. 1), a separately excited control input field winding 21 and a field winding 22 connected through a variable resistor 23 to a source of direct-current supply voltage 23a. The field windings 21 and 22 are connected so that their magnetic fields are in opposition. Adjustment of the resistor 23 thus varies the resultant field strength produced by field windings 21 and 22, so that the operating condition of generator G1 can be set correctly for a given degree of control desired with a particular input control voltage applied to control input field winding 21. Generator G2 has a control field winding 31 connected in series both with the armature 1 of generator G1 and with the field winding 24. The series field winding 34 of generator G2 is connected through the output terminals of the machine to the load (not illustrated). The generator G2 is also provided with a field winding 32 connected through a variable resistor 33 to the source of supply voltage 23a. The field windings 31 and 32 are connected so that their magnetic fields are in opposition. Adjustment of variable resistor 33 will, therefore, allow setting the resultant field excitation of generator G2 for optimum operating conditions.

As shown in Fig. 2, the input stage G1 and the output stage G2 of the machine are provided with a common cylindrical housing 4 and have a common rotor shaft 5. The shaft 5 is journalled in end plates 5a and 6 secured to housing 4. Fixed against the end plate 6 is the housing 7 of the drive motor 8, the rotor 9 of which is mounted on the unilaterally journalled end portion 10 of the common rotor shaft 5. The two armatures 1 and 2 have the same diameter. The corresponding stacks of laminations of the respective stator structures 25 and 26 have the same outer diameters. The end plate 6 has openings 17 for the flow of cooling air, as is hereinbelow explained.

One side of the cylindrical motor housing 7 has a plurality of air flow openings 11. The dynamo-electric amplifier housing 4 has a perforated maintenance opening cover 12 at its end opposite the drive motor 8, for influx of air. The maintenance opening 14 at the end of housing 4 near the drive motor 8 is fitted with a non-perforated sealing cover 15. The amplifier housing 4 is also provided with a centrally located air outlet opening against which is secured perforated cover 13. A double-acting fan rotor 16, operative to suck air from both sides within the machine, is mounted on shaft 5 in the vicinity of the air outlet cover 13. The fan is provided with surrounding shield structure which provides an annular air discharge passage thereabout.

Secured against the inside of the drive motor housing 7 near the peripheral surfaces of the stator laminations 20 and in the vicinity of the air openings 11 are a transverse rib 18 and longitudinal ribs 19 defining air flow channels through which air, sucked in by the fan rotor 16, will flow in the direction indicated by the arrow. The cooling air will thus flow along the laminations 20, over the stator winding heads 21, back through air flow channels along the laminations at the other side of the stator, over the winding heads 22 through the openings 17, and into the input stage G1, from which the cooling air will finally be blown out through the perforated cover 13 by the blower fan 16. At the other end of the machine, cooling air will be drawn in through the perforated cover 12 past the output stage G2 and similarly discharged through the perforated cover 13. The air supply is therefore so guided that the output stage is directly traversed by the fresh air, whereas the input stage is traversed by cooling air indirectly through the drive motor. Consequently, cooling suited to the needs of each of the amplifier stages is secured.

It will be obvious to those skilled in this art upon a study of this disclosure that our invention permits of various modifications of the particular embodiment illustrated and described herein without departing from the spirit of the invention and within the scope of the claims annexed hereto.

We claim:

1. A two-stage amplifying machine, comprising two direct-current generators having a common armature shaft and being connected in cascade with each other to form first and second amplifying stages respectively, a field winding of the second stage generator being energized by the armature current of the first stage generator, a drive motor for rotating said common armature shaft, the armature of said drive motor being secured to the end of said common armature shaft which is adjacent the first stage generator, a housing structure surrounding said generators and said drive motor, a ventilating blower secured to said shaft at a position between the armatures of said generators, an air outlet opening in said housing structure for said blower, said housing structure having air inlets, one leading to the second stage generator, and a second leading to the drive motor, said blower being operative to induct air through said inlets and discharge it through said air outlet opening, the first stage generator being cooled by air inducted through the second inlet, baffle means being provided to impede a direct path of flow of air from the second inlet to the first stage generator and to deflect air entering said second inlet about the drive motor.

2. A two-stage amplifying machine, comprising two direct-current generators having a common armature shaft and being connected in cascade with each other to form first and second amplifying stages respectively, a field winding of the second stage generator being energized by the armature current of the first stage generator, a drive motor for rotating said common armature shaft, the armature of said drive motor being secured to the end of said common armature shaft which is adjacent the first stage generator, a housing structure surrounding said generators and said drive motor, a ventilating blower secured to said shaft at a position between the armatures of said generators, said blower comprising a plurality of radially extending impeller blades, an air outlet opening in said housing structure for said impeller blades, shield structure defining an annular zone intermediate said blower and the interior of said housing structure, said housing structure having air inlets, one leading to the second stage generator, and a second leading to the drive motor, said impeller blades being operative to suck air through said air inlet openings and force it through said annular zone and out said outlet opening, the first stage generator being cooled by air inducted through the second inlet, baffle means being provided to impede a direct path of flow of air from the second inlet to the first stage generator and to deflect air entering said second inlet about the drive motor.

3. A two-stage amplifying machine, comprising two direct-current generators having a common armature shaft and being connected in cascade with each other to form first and second amplifying stages respectively, a field winding of the second stage generator being energized by the armature current of the first stage generator, a drive motor for rotating said common armature shaft, the armature of said drive motor being secured to the end of said common armature shaft which is adjacent the first stage generator, a housing structure surrounding said generators and said drive motor, a ventilating blower secured to said shaft at a position between the armatures of said generators, an air outlet opening in said housing structure for said blower, air inlets at each end of said housing structure, channel means within said housing structure and communicating with said air inlet means at the drive motor end of said housing structure for directing air over the stator structure of said drive motor, around the outer end of said armature of said drive motor and back over said stator structure at the opposite side thereof, said blower means being operative to induct air through said inlets and discharge it through said outlet opening, the first stage generator being cooled by air inducted through the air inlet at the drive motor end of the housing.

4. The machine described in claim 3, wherein said channel means comprises a plurality of longitudinal walls between the interior of said housing structure and said stator structure of said drive motor, and transverse walls at the inner ends of said longitudinal walls in the vicinity of said drive motor air inlet means.

5. A dynamo-electric amplifying machine comprising a first housing, a shaft centrally journalled within said first housing, two coaxial direct-current generators having respective armatures mounted on said shaft and having respective stators stationarily mounted within said first housing, the two generators being connected in cascade to form first and second amplifying stages respectively, a field winding of the second stage generator being connected across the armature of the first stage generator, said shaft having a portion extending outwardly of the end of said first housing which is adjacent the first stage generator, a drive motor having its armature secured to said outwardly extending portion of said shaft, a second housing surrounding said drive motor, said second housing being joined with said first housing, a forced-air cooling blower secured to said shaft at a position between the armatures of said generators, an air outlet opening in said first housing for said blower, and air inlets in each of said first and second housings, said blower being operative to draw air through said inlets from both ends of said first housing and discharge it through said air outlet opening.

6. A dynamo-electric amplifying machine comprising a first housing, a shaft centrally journalled within said first housing, two coaxial direct-current generators having respective armatures mounted on said shaft and having respective stators stationarily mounted within said first housing, said shaft having a portion extending outwardly of one end of said first housing, a drive motor having its armature secured to said outwardly extending portion of said shaft, a second housing surrounding said drive motor, said second housing being joined with said first housing, a forced-air cooling blower secured to said shaft at a position between the armatures of said generators, said blower comprising a plurality of radially extending impeller blades, an air outlet in said first housing in register with said impeller blades, shield structure defining an annular zone intermediate said blower and the interior of said first housing, and air inlets in each of said first and second housings, said blower being operative to draw air through said inlets from both ends of said first housing and discharge it through said air outlets, air baffle and channel means being provided adjacent the air inlet of the second housing to deflect air entering said inlet above the drive motor, the generator adjacent the motor being a first stage amplification generator connected in cascade with the other generator which constitutes the second stage of amplification from which the direct current output is derived.

7. A dynamo-electric amplifying machine comprising a first housing, a shaft centrally journalled within said first housing, two coaxial direct-current generators having respective armatures mounted on said shaft and having respective stators stationarily mounted within said first housing, said shaft having a portion extending outwardly of one end of said first housing, a drive motor having its armature secured to said outwardly extending portion of said shaft, a second housing surrounding said drive motor, said second housing being joined with said first housing, a forced-air cooling blower secured to said shaft at a position between the armatures of said generators, an air outlet in said first housing for said blower, and air inlet in each of said first and second housings, channel means within said second housing and communicating with said air inlet means in said second housing for directing air over the stator structure of said drive motor, around the outer end of said armature of said drive motor and back over said stator structure at the opposite side thereof, said blower means being operative to induct air through said inlets and discharge it through said outlet.

8. The machine described in claim 7, wherein said channel means comprises a plurality of longitudinal walls between the interior of said second housing and said stator structure, and transverse walls at the inner ends of said longitudinal walls in the vicinity of said second housing inlet means to impede a direct path of air flow from the latter inlet to said first housing.

9. The machine defined in claim 7, in which the generator adjacent the motor is a first stage amplification generator connected in cascade with the other generator which constitutes the second stage of amplification from which the direct current output is derived.

10. A dynamo-electric amplifying machine comprising a first housing, a shaft centrally journalled within said first housing, two coaxial direct-current generators having respective armatures mounted on said shaft and having respective stators stationarily mounted within said first housing, the two generators being connected in cascade to form first and second amplifying stages respectively, a field winding of the second stage generator being connected across the armature of the first stage generator, said shaft having a portion extending outwardly of the end of said first housing which is adjacent the first stage generator, a drive motor having its armature secured to said outwardly extending portion of said shaft, a second housing surrounding said drive motor, said second housing being joined with said first housing, a forced-air cooling blower secured to said shaft at a position between the armatures of said generators, an air outlet opening in said first housing for said blower, and air inlets in each of said first and second housings, said blower being operative to draw air through said inlets from both ends of said first housing and discharge it through said air outlet opening, the first housing having a larger diameter than the second to permit latitude in choice of size of the blower.

11. A dynamo-electric amplifying machine comprising a first housing, a shaft centrally journalled within said first housing, two coaxial direct-current generators having respective armatures mounted on said shaft and having respective stators stationarily mounted within said first housing, said shaft having a portion extending outwardly of one end of said first housing, a drive motor having its armature secured to said outwardly extending portion of said shaft, a second housing surrounding said drive motor, said second housing being joined with said first housing, a forced-air cooling blower secured to said shaft at a position between the armatures of said generators, an air outlet in said first housing for said blower, an air inlet in each of said first and second housings, channel means within said second housing and communicating with said air inlet means in said second housing for directing air over the stator structure of said drive motor, around the outer end of said armature of said drive motor and back over said stator structure at the opposite side thereof, said blower means being operative to induct air through said inlets and discharge it through said outlet, the first housing having a larger diameter than the second to permit latitude in choice of size of the blower.

References Cited in the file of this patent
UNITED STATES PATENTS

| | | |
|---|---|---|
| 959,901 | Underwood | May 31, 1910 |
| 2,465,262 | Packer | Mar. 22, 1949 |
| 2,491,321 | Lanter | Dec. 13, 1949 |
| 2,610,992 | Johns | Sept. 16, 1952 |
| 2,690,513 | Tamm | Sept. 28, 1954 |